United States Patent

Hartman

[15] 3,672,218

[45] June 27, 1972

[54] SYSTEM FOR MEASURING TEMPERATURE OF A CRYOGENIC ENVIRONMENT

[72] Inventor: Richard L. Hartman, Huntsville, Ala.

[73] Assignee: The United States of America as represented by the Secretary of the Army

[22] Filed: Jan. 26, 1971

[21] Appl. No.: 109,876

[52] U.S. Cl. .................................73/362 AR, 73/362 R
[51] Int. Cl. .................................G01k 7/24, G01k 7/34
[58] Field of Search ...............73/362 R, 362 CP, 362 AR

[56] References Cited

UNITED STATES PATENTS 3,477,292  11/1969  Thornton .....................73/362 AR
3,620,082  11/1971  Peters .........................73/362 AR Primary Examiner—Louis R. Prince
Assistant Examiner—Frederick Shoon
Attorney—Harry M. Saragovitz, Edward J. Kelly, Herbert Berl and Charles R. Carter

[57] ABSTRACT

A system for measuring the temperature of a cryogenic environment including an RC circuit provided with a source of reference voltage with a resistance sensor disposed within the environment and connected to a trigger. A pulser is connected to supply the RC circuit and a temperature indicator is connected to a pulser and trigger to count the RC interval for determination of the temperature of the environment.

2 Claims, 2 Drawing Figures

PATENTED JUN 27 1972　　　　　　　　　3,672,218

Richard L. Hartman,
INVENTOR.

SYSTEM FOR MEASURING TEMPERATURE OF A CRYOGENIC ENVIRONMENT

BACKGROUND OF THE INVENTION

This invention relates to the field of measurement of cryogenic temperatures in small volume environments.

Temperature readings of contemporary direct current (DC) devices are in error due to thermal EMF's or generation of heat in junctions between dissimilar metals. The heat generated in the time required to balance the measuring devices of the current systems is sufficient to cause a significant increase in the temperature and consequent error in the temperature indication. Alternating current (AC) measuring devices generate errors due to continuous induction between members of the circuit.

SUMMARY OF THE INVENTION

The claimed system eliminates the errors of both current systems to measure cryogenic temperatures with power less than 1 micro watt. A pulser is connected to an RC circuit to operate a trigger having a reference voltage. An intervalometer measures the time for the pulse to operate the trigger. If the reference voltage is set at a particular fraction of full value the counter reads the time interval of one time constant (RC). Thus if C is known, R can be determined. If C has a decimal value the counter reads directly a decimal multiple of R. The induction error and the energy build up due to the time required to balance the DC system are thus avoided. The thermal EMF's are not only reduced by elimination of the balancing time but the percent thermal EMF error is fractionated due to the high level of the pulse voltage.

This invention may be better understood from the following detailed description taken in conjunction with the accompanying drawing.

DESCRIPTION OF THE PREFERRED EMBODIMENT

Figure 1:
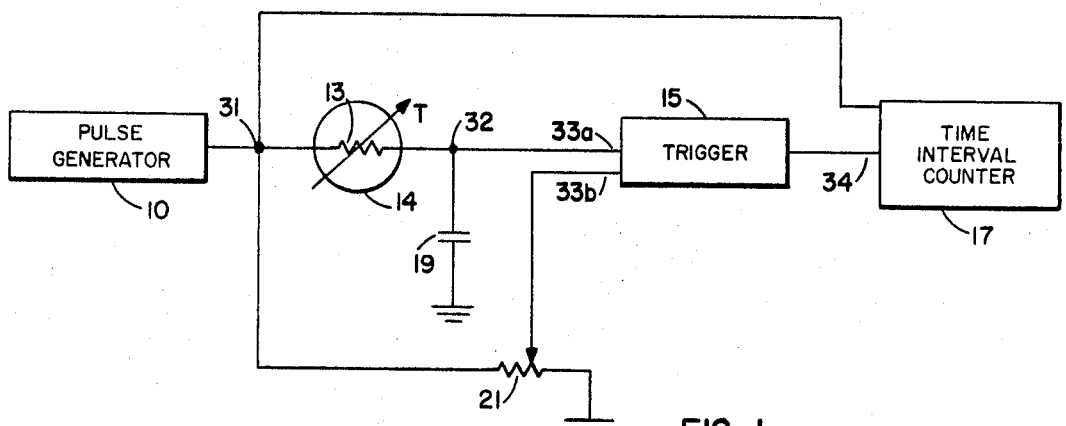
FIG. 1 is a schematic of the measuring circuit.

Reference numeral 10 indicates a generator for applying high level voltage pulses to the measuring system. An RC circuit consists of a sensor 13 located in a cryogenic environment 14 and a capacitor 19. The resistance of sensor 13 decreases with temperature. The RC circuit is connected to the input of a trigger 15 that in turn is connected to a variable potentiometer 21 for supplying a reference voltage thereto. Thus it is seen that the pulser supplies an indigenous reference to the trigger.

A time interval counter 17, which acts as a temperature indicator, is connected by a lead from the pulse generator for receiving the initial turn on pulse from generator 10 and is also connected to the output of trigger 15 for receiving a trigger output signal to turn off the counter.

Figure 2:
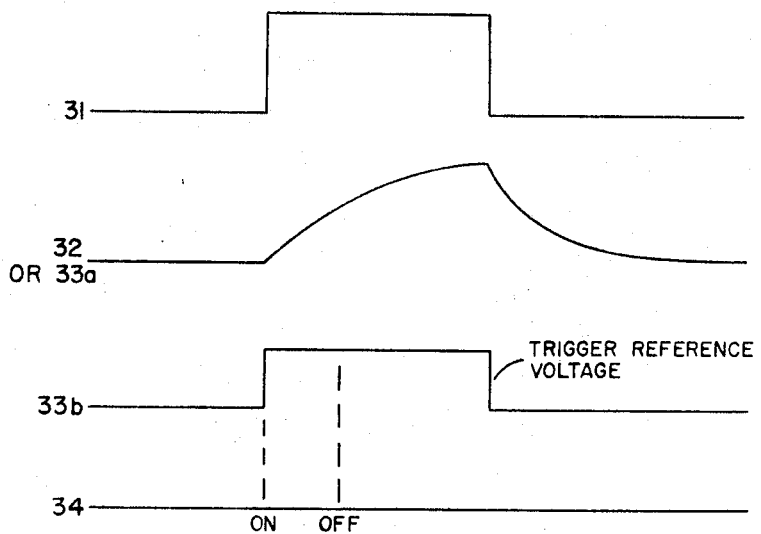
FIG. 2 is a chart of the timing sequence.

When the pulse generator is turned on, an initial pulse shown in FIG. 2 as 31 will turn counter on as indicated in FIG. 2 by reference numeral 34. Simultaneously the pulse will impress a value on the trigger input 33b from the pulse generator through variable potentiometer 21. Also the pulse is applied across resistor 13 to charge capacitor 19, the voltage rises exponentially with the time constant of the RC circuit as shown by 32 in FIG. 2. The trigger compares the voltage across the capacitor from input 33a with the voltage set by potentiometer 21 and when they are equal, the trigger sends an output signal to turn off the counter as seen at 34b in FIG. 2.

With the reference voltage set at substantially 0.632 of full value, the counter records the time interval of one pulse which is equal to the circuit time constant RC (the time to charge capacitor 19). If C is known, R can be determined and if C has a decimal value, e.g. 1.0 ufd, the scale of the time interval counter 17 can be calibrated to read temperature by determination of the readings for a particular resistor 13 at 4.2° Kelvin the temperature of liquid helium, at 21° Kelvin the temperature of liquid hydrogen and at 77° Kelvin the temperature of liquid nitrogen and can be interpolated therebetween. The current through the resistor drops to zero as the capacitor charges therefore only a given increment of energy is dissipated in the resistor for each pulse, regardless of how long the pulse is. If the pulse interval is made much longer than the time constant, the power in the system is reduced by this duty factor. A 10 Mhz (megahertz) clock in the counter affords a four digit measurement and may be regulated to sample the temperature once per second. Each reading takes less than 1 millisecond giving a duty factor of one one-thousandth. The duty factor can be selected to limit the power dissipated in the resistor to a value that will not materially effect the temperature of the environment.

I claim:

1. A system for measuring the temperature of a cryogenic environment comprising: a resistor-capacitor (RC) circuit having a temperature-responsive resistor disposed within the environment and connected between a trigger and a pulser which supplies power to the RC circuit; an indigenous source of reference voltage, said trigger responding to a voltage across the RC circuit equal to said reference voltage, and a temperature indicator connected to the pulser and trigger to count the RC interval for determination of the temperature of the environment.

2. A system as defined in claim 1 with said source of reference voltage comprising a grounded variable potentiometer connected between said pulser and said trigger.

* * * * *